United States Patent [19]

Hodapp

[11] 4,218,814

[45] Aug. 26, 1980

[54] METHOD OF INSULATING CONDUIT

[75] Inventor: Norbert J. Hodapp, Smoke Rise, N.J.

[73] Assignee: Dart Industries Inc., Los Angeles, Calif.

[21] Appl. No.: 28,430

[22] Filed: Apr. 9, 1979

Related U.S. Application Data

[62] Division of Ser. No. 843,609, Nov. 19, 1977, abandoned.

[51] Int. Cl.³ .............................................. B23P 11/02
[52] U.S. Cl. ..................................... 29/450; 29/453; 29/526 R; 138/121; 138/154; 138/166; 138/167
[58] Field of Search ............. 29/450, 453, 235, 526 R, 29/148.4 D; 138/166–168, 156, 149, 121, 154, 162

[56] References Cited

U.S. PATENT DOCUMENTS

| | | | |
|---|---|---|---|
| 1,435,311 | 11/1922 | Knight | 29/450 UX |
| 2,574,249 | 11/1951 | Crowson et al. | 29/450 UX |
| 3,060,069 | 10/1962 | Sindars | 138/121 X |
| 3,203,653 | 8/1965 | Hall | 138/156 X |
| 3,237,796 | 3/1966 | Callahan | 29/450 X |
| 3,517,702 | 6/1970 | Mueller et al. | 138/166 X |
| 3,812,562 | 5/1974 | Lovett | 29/450 X |

Primary Examiner—Charlie T. Moon
Attorney, Agent, or Firm—Leigh B. Taylor

[57] ABSTRACT

An elongate flexible tubular sheath has a longitudinal slit therethrough from end to end. The sheath is placed over a conduit, having an outside diameter not smaller than the inside diameter of the sheath. Subsequently, the sheath is tightened about the conduit and the edges of the slit forced together in response to helical twisting of the sheath. Means are provided for retaining the sheath in the helically twisted position.

10 Claims, 14 Drawing Figures

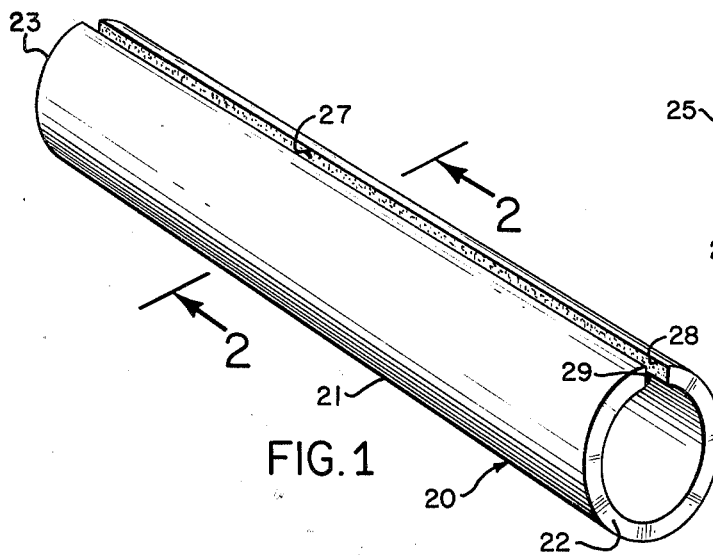
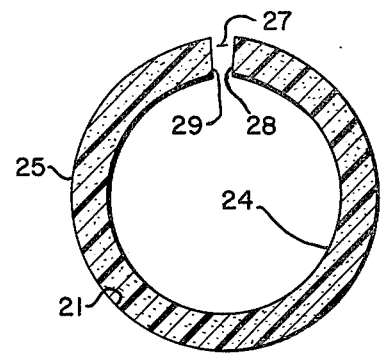
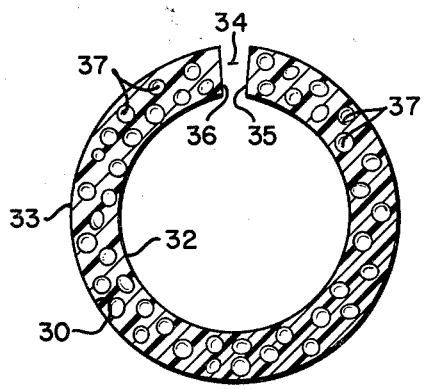
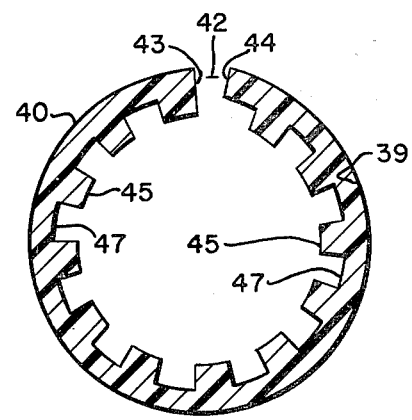
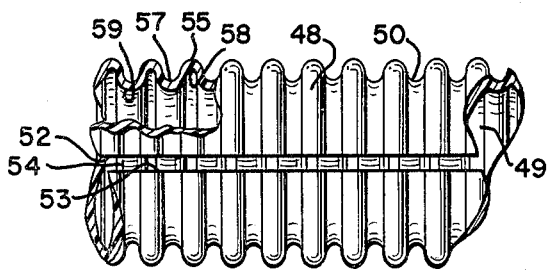
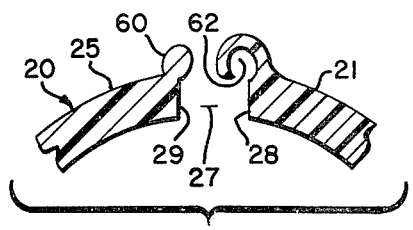
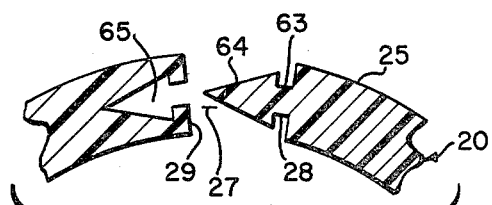

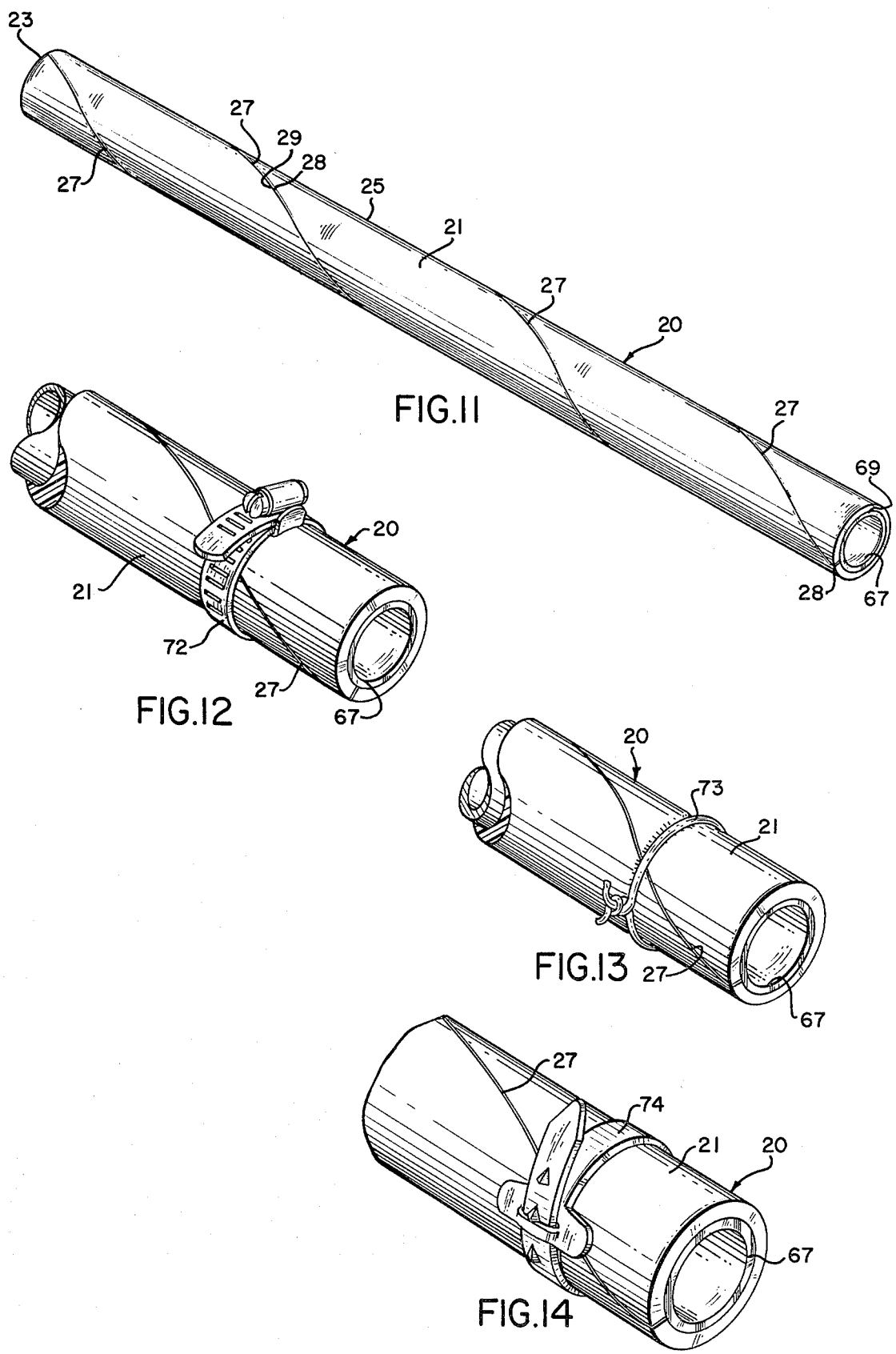

METHOD OF INSULATING CONDUIT

This a division of application Ser. No. 843,609, filed Nov. 19, 1977, now abandoned.

This invention generally relates to thermal insulation.

More particularly, the instant invention concerns insulation for tubes, pipes and other forms of conduits.

In a further aspect, the present invention concerns structure and method for insulating a conduit.

Various fluids are commonly transported by assorted conduits. Water and steam, for example, are conventionally carried within relatively heavy walled iron pipe. By contrast, heated air is usually moved through a thin walled sheet metal duct. Copper tubing, on the other hand, is the generally accepted standard for routing refrigerants. Other and diverse fluids and conduits are well known.

Certain considerations are common to most fluid carrying conduit systems. Of immediate interest is the interaction between the specific fluid and the environment through which the conduit passes. A primary interaction, due to the thermal conductivity of the conduit, is the tendancy for the fluid and the environment to achieve a common temperature. The corresponding heat loss or gain can have a detrimental effect upon the fluid and conversely upset the desired ambient temperature.

Frequently, moisture condenses on the exterior surface of a conduit under specific conditions. The moisture collects in droplets which fall from the conduit with an often deleterious effect on the environment, especially if the environment includes electrical apparatus or structure susceptible to water damage. Direct thermal transfer, especially intense hot or cold, can destroy structure which is in contact with the conduit.

For the foregoing and other readily apparent reasons, including personal safety, it has been a standard practice of long standing to insulate conduits. In accordance with a conventional method, flexible strip stock, such as asbestos, is wound around the conduit and secured with a paste adhesive. Greater insulative value is had by placing semi-cylindrical sections of expanded material, such as glass wool, around the conduit and binding with tape. Other methods include the use of coatings which are applied by brush or spray.

Applied coatings create untidy working conditions and generally require specialized application apparatus. Many insulating materials, asbestos and glass wool for example, are harmful to human health. In addition, proper application of insulation generally requires a high degree of skill. This is attested by the fact that the insulation trade is an occupational specialty. Recently, governmental agencies have been established for the purpose of urging citizens to be conservative of the rapidly depleting natural resources. Adequate use of insulation to prevent thermal loss is consistant with national goals. The use of insulation extends to conduits. However, it is beyond the level of skill of the ordinary person to satisfactorily execute the task. In many cases, employing a professional insulator is not considered financially feasible.

It would be highly advantageous, therefore, to remedy the foregoing limitations and deficiencies heretofore associated with the insulation art.

Accordingly, it is an object of this invention to provide improved means and method for the insulation of fluid carrying conduits.

Another object of the invention is the provision of a prefabricated insulation structure.

And, another object of the invention is to provide an insulation structure in the form of a sheath which is conveniently applied over tubes, pipes, ducts and other conduits.

Still another object of the invention is the provision of an insulative sheath which is readily manufactured in assorted sizes to accommodate conduits of various sizes.

Yet another object of the present invention is to provide an insulative sheath which can be fabricated to exhibit physical characteristics selected in accordance with specific intended uses.

A further object of the invention is the provision of a simplified method of applying an insulative cover to conduits.

And, a further object of this invention is to provide a method of predetermining the quality of insulation required to encase a given conduit.

Still a further object of the invention is the provision of means and method for insulating conduit without special skills or tools.

Yet a further object of the instant invention is to provide an insulation structure of the above type which is relatively inexpensive to manufacture yet is comparatively effective and durable.

Briefly, to achieve the desired objects of a covering for encasing a conduit in accordance with the instant invention, provided is a flexible tubular sheath preferably fabricated of a material chosen for insulative qualities and resistance to flammability. A longitudinal slit extends through the sheath between the ends thereof, forming a pair of opposed edges. In the unstressed condition, the sheath has an inside diameter not greater than the outside diameter of the pipe, tube or other conduit to be insulated. Also, in the unstressed condition, the opposed edges of the slit may be abutting or spaced.

In accordance with a preferred method of application, the conduit is encased within the sheath by passing the conduit through the slit. There after, the sheath, with the conduit therein, is helically twisted to tighten the sheath about the conduit by forcing the opposed edges of the slit toward abutting engagement. Alternately, the conduit is progressively passed through the slit from end to end as the sheath is helically twisted. Subsequently, the sheath is secured in place by integral locking means, or by auxiliary binding or clamping devices.

The foregoing and further and more specific objects and advantages of the instant invention will become readily apparent to those skilled in the art from the following detailed description of preferred embodiments and methods thereof, taken in conjunction with drawings in which:

FIG. 1 is a perspective view of an insulative covering constructed in accordance with the teachings of the instant invention;

FIG. 2 is an enlarged vertical section view taken along the line 2—2 of FIG. 1;

FIG. 3 is a view generally corresponding to the view of FIG. 2 and illustrating an alternate embodiment thereof;

FIG. 4 is a view generally corresponding to the view of FIG. 2 and showing a further embodiment thereof;

FIG. 5 is a side view of a fragmentary section of an alternate insulative covering embodying the instant invention;

FIG. 6 is an enlarged fragmentary vertical section view showing preferred engagement means useful in connection with the device of FIG. 1;

FIG. 7 is a view generally corresponding to the illustration of FIG. 6 and illustrating alternate engagement means;

FIG. 11 is a perspective view of the conduit of FIG. 9 as it would appear when fully encased by the covering of FIG. 8;

FIG. 12 is an enlarged view of a fragmentary section of the assemblage of FIG. 11 and illustrating an auxiliary engagement means for retaining the assembly;

FIG. 13 is a view generally corresponding to the view of FIG. 12 and illustrating an alternate engagement means; and FIG. 14 is a view generally corresponding to the view of FIG. 12 and illustrating a further alternate engagement means.

Figure 8:
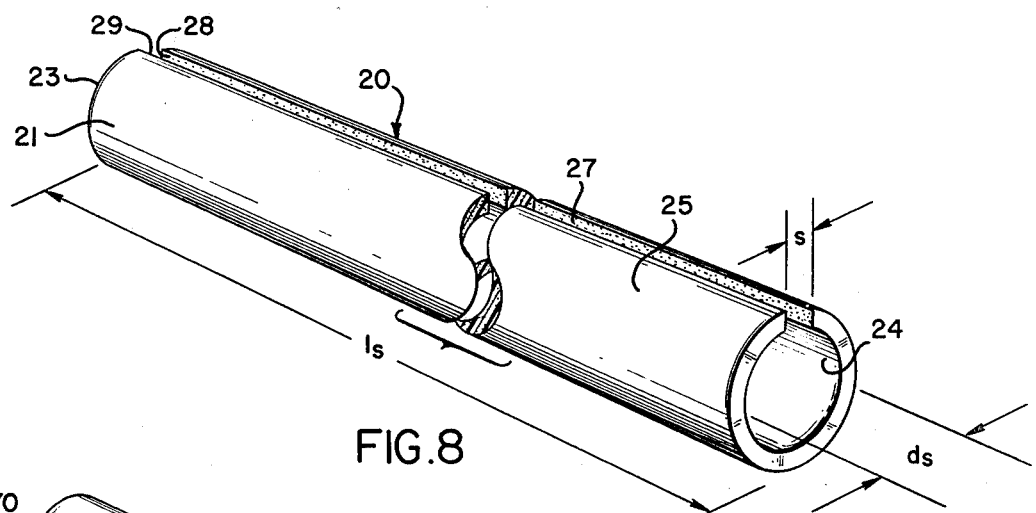
FIG. 8 is a broken perspective view of a covering chosen for purposes of graphically representing a typical covering of the instant invention.

Turning now to the drawings, in which the same reference characters indicate corresponding elements throughout the several views, preferred embodiments of an insulative structure constructed in accordance with the teachings of the instant invention, will be described first and subsequently, a method of insulating a conduit embodying the principles of the instant invention will be set forth.

APPARATUS

FIG. 1 illustrates a covering, generally designated by the reference character 20, for encasing and insulating a conduit in accordance with the present invention. Covering 20 includes an elongate flexible tubular sheath 21 having first and second open ends 22 and 23. As further viewed, in FIG. 2, sheath 21 has an inner surface 24 and an outer surface 25. Slit 27 extends generally radially between inner surface 24 and outer surface 25 and generally longitudinally along sheath 21 between ends 22 and 23. The distance between edges 28 and 29, expressed as the width of slit 27, is greatly variable, as will become apparent during the ensuing description in connection with the method.

As specifically illustrated in FIG. 2, sheath 21 is formed, such as by extrusion, of a foamed material, such as rubber, urethane or vinyl. The insulation value of foamed material is well established. FIG. 3 shows sheath 30 which comprises an alternate embodiment of a covering of the instant invention. Sheath 30, generally analogous to sheath 21, includes inner surface 32, outer surface 33 and longitudinal slit 34 between opposed edges 35 and 37. Although not specifically seen in the immediate illustration, sheath 30 is an elongate tubular member extending between first and second open ends. The insulative value of sheath 30 is enhanced by air cells 37. Utilizing plastic extrusion techniques, air cells 37 are readily formed as passages extending the length of sheath 30. Alternately, by other fabrication techniques, a multiplicity of closed air cells are created throughout the structure.

FIG. 4 illustrates an elongate sheath 39 embodying principles of the instant invention. Generally similar to the previously described embodiments, sheath 39 includes outer surface 40 and slit 42 formed between edges 43 and 44. Interiorly sheath 40 has a straight knurl formed by alternating longitudinally extending lands 45 and grooves 47. For purposes of orientation to the previous embodiment, lands 45 are considered the inner surface. Grooves 47 provide insulative air spaces analogous to air cells 37, as hereinbefore described.

Yet another embodiment of the present invention takes the form of sheath 48, as viewed in FIG. 5. Sheath 48, analogous to the previously described embodiments, has an inner surface 49, an outer surface 50 and a pair of longitudinally extending edges 52 and 53, which define slit 54 therebetween. The wall of sheath 50 is circumferentially corrugated, defining alternating external lands and grooves 55 and 57, respectively, which are opposite alternating internal grooves and lands 58 and 59, respectively. The circumferential corrugations are molded in either annular or spiral configurations. The air spaces formed by internal grooves 58 increase the insulative effect of the instant embodiment. While the alternating external lands and grooves 55 and 56, respectively, increase the external surface area which assists in the dissipation of thermal energy trapped within the structure.

Seen in FIG. 6 is a closure structure illustrated in combination with covering 20 as being generally representative of the previously described embodiments of the immediate invention. Bead 60 projects from outer surface 25 and extends longitudinally along covering 20 at edge 29. Bead 60 is the male element of a male-female connection pair. The female element of the male-female connection pair is represented by socket 62 projecting from outer surface 25 and extending longitudinally along edge 28. It is noted that bead 60 has an enlarged central section and that the central section of socket 62 is bigger than the opening thereof. Accordingly, bead 60 is retained within socket 62 by a snap engagement. Friction between the elements inhibits longitudinal sliding movement between bead 60 and socket 62.

An alternate engagement means in the form of a male-female connection pair for closing slit 27 is seen in FIG. 7. The male element includes a tongue 63 having an enlarged end 64 projecting from edge 28 into slit 27 and extending the length of covering 20. Socket 65 extends inwardly from edge 29 and is sized and shaped to matingly receive tongue 63 and enlarged end 64.

The Method

Sheath 21 of covering 20 has an inner surface 24, the diameter of which is given by the mathematical symbol $D_s$. Slit 27 has a width between edges 28 and 29 designated by the character S. The length of sheath 21, as measured between first and second open ends 22 and 23, respectively, is designated $L_s$. For the immediate purpose, the external diameter of sheath 21 can be neglected.

Figure 9:
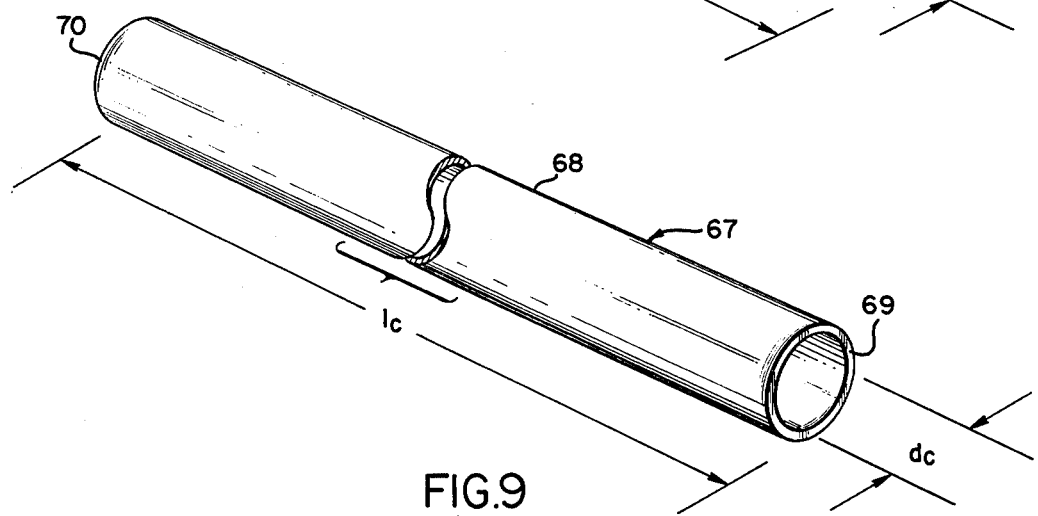
FIG. 9 is a broken perspective view of a typical conduit which can be insulated by the covering depicted in FIG. 8.

FIG. 9 shows a conduit generally designated by the reference character 67 and representative of typical pipe, tubing, duct and other generally tubular fluid passages. Conduit 67 has an external surface and first and second ends 69 and 70, respectively. The diameter of external surface 68 is given by the symbol $d_c$, while the length between ends 69 and 70 is represented by $l_c$. The material of construction and the size of opening through conduit 67 is not of immediate importance.

In preparation for insulating conduit 67, measurements are taken and real values assigned to the representative symbols $d_c$ and $l_c$. A covering 20 is then selected, having an inside diameter $d_s$ not greater than the outside diameter $d_c$ of conduit 67. The length of covering 20, which must be acquired in order to encase conduit 67 is then computed by the formula:

$$l_s = (d_c l_c) \div (d_s - S)$$

In an ideal situation, a covering is selected such that $d_s = d_c$. Assuming the conduit to have an external diameter of ⅝ inch and a length of 10-feet and a covering having an internal diameter equal to the external diameter of the conduit, and a slit with a width of 0.025 inches, the foregoing formula with real values substituted for the symbolic values becomes:

$$l_s = (0.625 \times 120) \div (0.600 - 0.025)$$

simplifying, this becomes:

$$l_s = (0.625 \times 120) \div 0.600$$

And solved:

$$l_s = 125$$

Thus, it is seen 125-inches of covering are necessary to encase and insulate the conduit, as set forth above.

Figure 10:
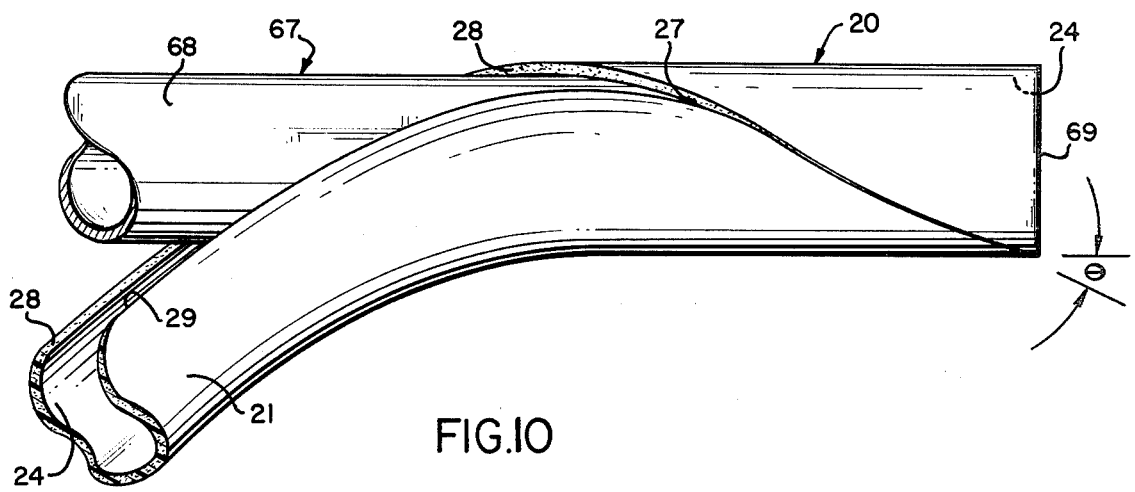
FIG. 10 is a broken plan view of the conduit of FIG. 9 as it would appear during initial phases of insulation by the covering of FIG. 8.

After a covering of appropriate dimension has been selected, it is applied to the conduit, as seen in FIG. 10. At one end of covering 20, slit 27 is urged apart to receive conduit 67 therethrough. A chosen end of the covering 20 is aligned with the chosen end of the conduit 67, as seen by ends 24 and 69, respectively. Thereafter, covering 20 is helically twisted as conduit 67 is progressively received through slit 27.

Twisting at the proper helical angle will urge edge 28 against edge 29, closing slit 27. The helical angle to close slit 27 is shown by the symbol $\theta$. As a guide for encasing conduit 67 within covering 20, the helical angle to which covering 20 is twisted can be determined by the following equation:

$$\cos \theta = (d_s - S) \div d_c$$

Substituting the values of the foregoing example:

$$\cos \theta = 0.00 \div 0.625$$

Thus:

$$\cos \theta = 0.960$$

With reference to a table of trigonomic functions:

$$\theta = 16° \; 16''$$

The foregoing procedure is continued until the entire conduit is encased, as seen in FIG. 11.

In an alternate procedure, covering 20 is first applied to conduit 67 in an unstressed condition. Conduit 67 is passed through slit 27, while the slit remains substantially straight and longitudinal of covering 20. Subsequently, covering 20 is twisted to obtain the configuration as seen in FIG. 11. The alternate procedure requires that at least one end of conduit 67 be free such that the extra initial length of covering 20 can extend beyond the end of the conduit.

During the application of the covering to the conduit, as described in connection with FIG. 10, edges 28 and 29 are progressively abutted and concurrently, one edge is affixed to the other edge by the engagement means, as described in FIGS. 6 and 7. Alternately, in the absence of especially provided engagement means ancillary means are employed to affix the edges either progressively during the helical twisting of the covering or after the twisting has been completed. Edges 28 and 29 are readily bonded by a suitable adhesive which is compatible with the material of construction of covering 20. Mechanical means can also be used for securing the covering to the conduit. Exemplary of suitable mechanical securement means is a hose clamp illustrated in FIG. 12, a twist tie 73 seen in FIG. 13 and a wire tie 74 shown in FIG. 14.

Various modifications and variations to the apparatus and method herein chosen for purposes of illustration will readily occur to those skilled in the art. To the extent that such modifications and variations do not depart from the spirit of the invention, they are intended to be included within the scope thereof, which is limited only by a fair interpretation of the appended claims.

I claim:

1. The method of insulating a conduit having an outside diameter and a length including the steps of:
   (a) selecting an elongate flexible tubular sheath having a length and having an inside diameter not greater than the outside diameter of said conduit;
   (b) forming a longitudinal slit through said sheath from end to end;
   (c) encasing said conduit within said sheath; and
   (d) rotating said sheath helically relative to said conduit.

2. The method of claim 1, wherein said encasing step includes the steps of:
   (a) spreading said slit; and
   (b) passing said conduit through said slit.

3. The method of claim 1, including the additional step of securing said sheath to said conduit.

4. The method of claim 2, wherein said forming step creates a sectoral slit of finite arcuate width between a pair of spaced edges extending along said sheath.

5. The method of claim 4, wherein said step of selecting includes the sub-step of determining the length of said sheath in accordance with the formula:

$$l_s = (d_c l_c) \div (d_s - S)$$

wherein:
$l_s$ = length of sheath
$l_c$ = length of conduit
$d_c$ = outside diameter of conduit
$d_s$ = inside diameter of sheath
$S$ = width of slit 6. The method of claim 4, wherein said rotating step is continued until said slit assumes a helical angle determined by the formula $$\cos \theta = (d_s - S) \div d_c$$

wherein
$\theta$ = helical angle of slit
$d_s$ = inside diameter of sheath
$S$ = width of slit
$d_c$ = outside diameter of conduit 7. The method of claim 4, wherein said rotating step is continued until said spaced edges are substantially abutted.

8. The method of claim 7 including the further step of affixing one of said pair of edges to the other of said pair of edges.

9. The method of claim 8, wherein said affixing is accomplished by mechanical means.

10. The method of claim 1, including the additional step of securing said sheath of said conduit.

* * * * *